United States Patent

[11] 3,550,707

| [72] | Inventor | Arthur A. Lange<br>5742 North 96th St., Milwaukee, Wis. 53225 |
|---|---|---|
| [21] | Appl. No. | 775,607 |
| [22] | Filed | Nov. 14, 1968 |
| [45] | Patented | Dec. 29, 1970 |

[54] STEERING DEVICE FOR SNOWMOBILES
3 Claims, 4 Drawing Figs.

[52] U.S. Cl. .................................................. 180/5, 280/21
[51] Int. Cl. ...................................................... B62m 27/02
[50] Field of Search .......................................... 180/3, 5, 6, 9.38, 9.44, 103; 280/16, 21; 188/5

[56] References Cited
UNITED STATES PATENTS

| 868,208 | 10/1907 | Moore | 180/103 |
| 1,314,667 | 9/1919 | Horner | 180/5 |
| 1,473,281 | 11/1923 | Colburn | 180/3 |
| 1,916,643 | 7/1933 | Steele | 180/6 |
| 2,171,846 | 9/1939 | Davidson | 180/9.44 |
| 2,846,017 | 8/1958 | Luchterhand | 180/5 |
| 3,309,150 | 3/1967 | Marier | 180/5 |

FOREIGN PATENTS

| 51,651 | 4/1910 | Switzerland | 280/21 |

*Primary Examiner*—Richard J. Johnson
*Attorney*—James E. Nilles

ABSTRACT: A snowmobile having a rear end steering device which is connected with the conventional front end steering mechanism so as to improve turning capabilities of the snowmobile particularly under adverse weather conditions.

PATENTED DEC 29 1970 3,550,707

Inventor:
Arthur A. Lange
By: James E. Nilles
Attorney

STEERING DEVICE FOR SNOWMOBILES

BACKGROUND OF THE DISCLOSURE

This invention pertains to snowmobiles of the type having an internal combustion engine for driving an endless track which propels the vehicle over the snow. The operator sits astride the vehicle and controls its direction through a front end steering mechanism which usually consists of a pair of laterally spaced skis that can be pivoted generally about a vertical axis so as to change the direction of the vehicle movement. These vehicles are usually very heavy when considering their size and the track laying, ground engaging propulsion means is generally located towards the rear of the vehicle. If insufficient snow is on the ground, the front steering skis are sometimes inadequate to provide sufficiently responsive steering characteristics and the operator finds it difficult to maneuver the vehicle and particularly, swing the track laying, rear end of the vehicle in the proper direction.

SUMMARY OF THE INVENTION

The present invention provides a rear end steering device for a snowmobile and which rear end steering device is connected and coordinated with the conventional front end steering mechanism of the vehicle. The arrangement is such that when the front end mechanism is turned in one direction, the rear end mechanism forces the rear end of the vehicle to swing in the opposite direction to thereby greater facilitate rapid and responsive turning movement.

These and other objects and advantages of the invention will appears hereinafter as this disclosure progresses, reference being had to the accompanying drawings.

DESCRIPTION OF A PREFERRED EMBODIMENT

Figure 1:
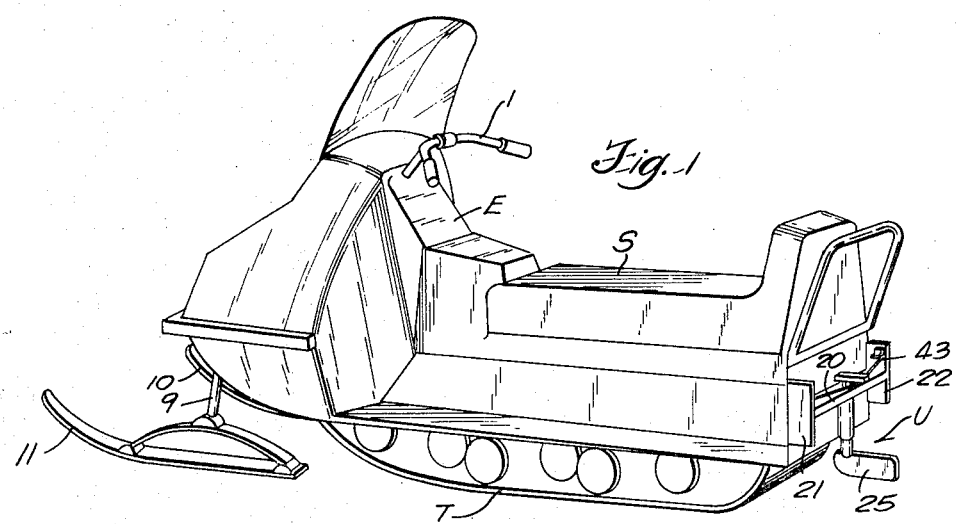
FIG. 1 is a perspective view of a snowmobile taken generally from the left rear side thereof, and which embodies the present invention.

The snowmobile shown in FIG. 1 includes an internal combustion engine E which drives an endless track T in the conventional manner. The operator sits astride the seat S and controls the front steering mechanism by the handlebars 1. Turning of the handlebars also turns the crank 2 located at the lower end of the steering rod 3 and this turning movement of the crank also forces swinging of the tie rods 4 and 5 which are attached thereto at their inner adjacent ends. The tie rods in turn are attached to rearwardly extending arms 6, 7 which are rigidly fixed to the top of the vertical steering post 8 and 9 of the respective front skis 10 and 11. This conventional means of steering needs no further description except to say that when the vehicle is being driven over bare ground or over ground with an insufficient amount of snow or furthermore on ground that has an icing condition, this front steering mechanism is incapable of providing proper and adequate steering effect.

In accordance with the present invention, a rear end steering device has been provided which acts in conjunction with the front end steering mechanism so as to quickly and positively cause the rear end of the vehicle to swing about in the proper direction when a turn is being made.

This rear end steering mechanism includes a frame member 20 rigidly fixed across the rear end of the vehicle frame. This member 20 is in the form of an inverted, generally U-shaped channel iron to which upstanding members 21 and 22 are welded, one at each end thereof. Centrally located on member 20 is a downwardly extending, tubular steel member 23 having an open lower end. A post 24 is of complementary shape to the inner diameter of the tubular steel member 23 and slides vertically therein. A rudder 25 is welded to the lower end of post 24 and extends generally rearwardly therefrom. A rod 26 is rigidly secured as by welding to post 24 and rudder 25 and a rearwardly extending crank arm 27 is rigidly fixed to the upper end of rod 26. Thus the crank arm 27, rod 26, post 24 and rudder 25 are rigidly fixed together for swinging as a unit U. It will be noted that rod 26 extends through an aperture 30 in the frame member 20 and thus good vertical support for the swingable steering unit U is provided. The unit can shift upwardly and downwardly in the supporting tubular member 23 and a spring 32 is positioned around rod 26 and acts against the underside of frame member 20 and also on the post 24 so as to urge the rudder 25 to a downward position when it firmly can engage the ground, snow, or ice as the case may be. On the other hand, if an obstruction is encountered by the rudder 25, the unit is free to raise upwardly against the bias of the spring 32 and thus ride over the obstruction without damage to the vehicle.

Steering cables 40 and 41 are secured at their rear ends to the rearwardly extending crank arm 27 and are then trained around their respective pulleys 42, 43 that are journaled on the side members 21 and 22, respectively. These cables then extend forwardly alongside the vehicle and are trained around the pulleys 44 and 45 located adjacent the front end of the vehicle. The forward ends of these cables 40, 41 are then fixed to the front steering mechanism, for example to tie rods 4 and 5, respectively.

Figure 2:
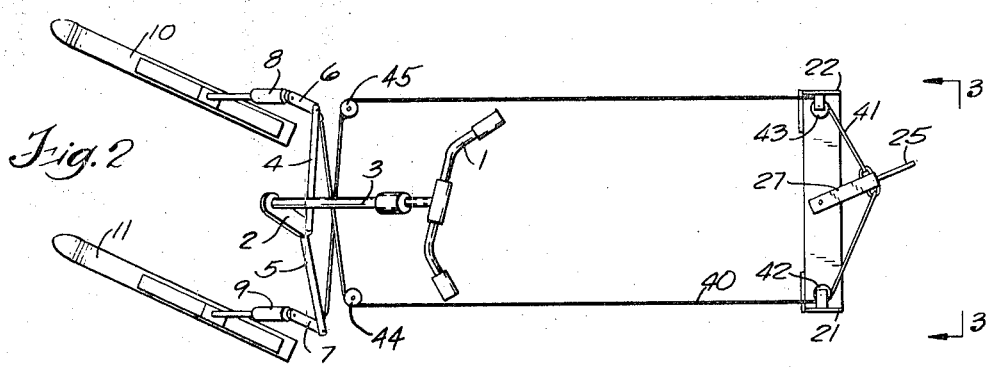
FIG. 2 is a schematic plan view of the steering mechanism shown in FIG. 1, but on a reduced scale and showing g showing the front and rear mechanism when moved to a turning position.
Figure 3:
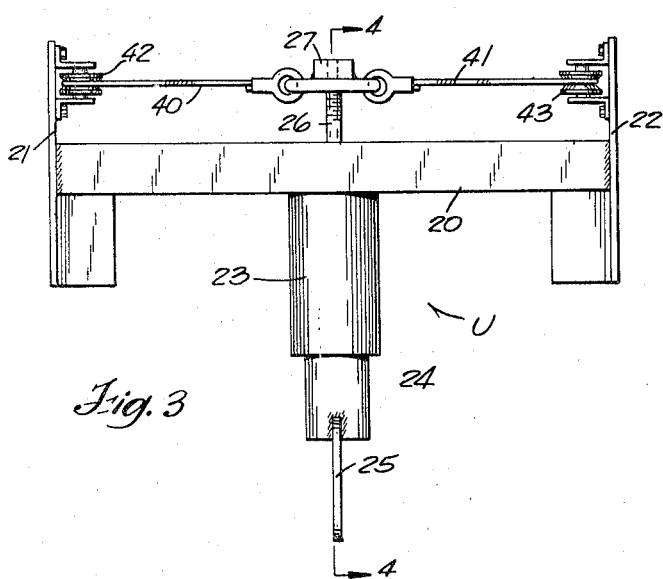
FIG. 3 is a rear view of the rear steering mechanism taken along line 3–3 in FIG. 2, but on an enlarged scale.
Figure 4:
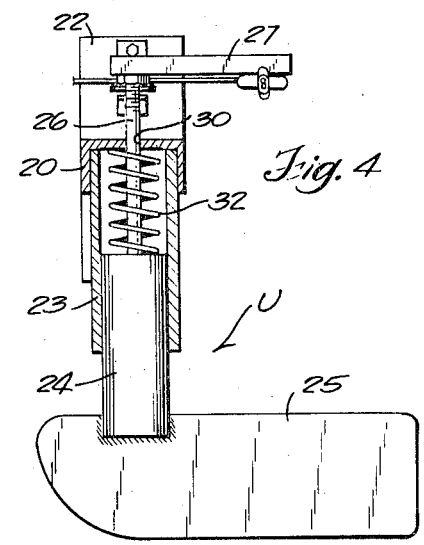
FIG. 4 is a sectional view taken generally along line 4–4 in FIG. 3.

As indicated in FIG. 2, when the handlebars are turned to the right as viewed from the direction of the operator, the rudder 25 is swung to the left, thus causing the rear end of the vehicle to swing to the left and facilitating turning of the entire vehicle.

In this manner, a positive steering effect is provided at each end of the vehicle and they are coordinated so as to cause the vehicle to turn promptly and positively.

I claim:

1. In a snowmobile having a front end steering mechanism of the type including a pair of ground engaging, laterally spaced apart skis, the tie rod means connected to said skis, and steerable means for shifting said tie rods, a generally rearwardly located ground engaging, endless track propulsion system, and an internal combustion engine for driving said propulsion system, the improvement comprising; a rear end steering device rigidly secured to the rear end of the said snowmobile and including a steering unit which is swingable about a generally vertical axis, a said unit including a transversely central and rearwardly extending and relatively narrow rudder for engagement with the material over which the snowmobile traverses, and means connecting said unit with said front end steering mechanism whereby turning said front end steering mechanism in one direction causes turning of said rear end steering unit in the opposite direction to thereby provide a steering effect at each end of the snowmobile.

2. A snowmobile as described in claim 1 further characterized in that said rear end steering unit is also vertically shiftable in said frame, and including resilient means between said frame and said unit for biasing the latter toward a downward direction.

3. A snowmobile as set forth in claim 2 wherein said connecting means includes a pair of flexible cables.